United States Patent

[11] 3,559,534

| [72] | Inventor | Harrison Munro |
| | | Aurora, Ill. |
| [21] | Appl. No. | 723,464 |
| [22] | Filed | Apr. 23, 1968 |
| [45] | Patented | Feb. 2, 1971 |
| [73] | Assignee | Pines Engineering Co., Inc. |
| | | a corporation of California |

[54] HYDRAULIC ACTUATOR CONTROL CIRCUIT
2 Claims, 4 Drawing Figs.

[52] U.S. Cl. ...................................................... 91/363,
91/447, 91/448
[51] Int. Cl. ...................................................... F15b 9/03,
F15b 9/09
[50] Field of Search ........................................... 91/363, 361
(Cursory); 91/446, 447 (Cursory), 448 (Cursory)

[56] References Cited
UNITED STATES PATENTS

| 3,018,988 | 1/1962 | Ernst et al. ...................... | 91/363 |
| 3,020,705 | 2/1962 | Hill ................................ | 91/363 |
| 2,157,707 | 5/1939 | Keel ............................... | 91/446 |
| 2,706,968 | 4/1955 | Smallpeice ...................... | 91/446 |

OTHER REFERENCES

Hydraulic Handbook, 2nd Edition; published by Trade and Technical Press, Limited, Nlorden, Surrey, England 1960; page 547; T J 840 H97 1960 C.3

Primary Examiner—Paul E. Maslousky
Attorney—Hofgren, Wegner, Allen, Stellman and Mc Cord ABSTRACT: A hydraulic servo drive system with a regulator valve connected in series with a servovalve, and which maintains a constant pressure drop across the servovalve and a uniform drive velocity in the system.

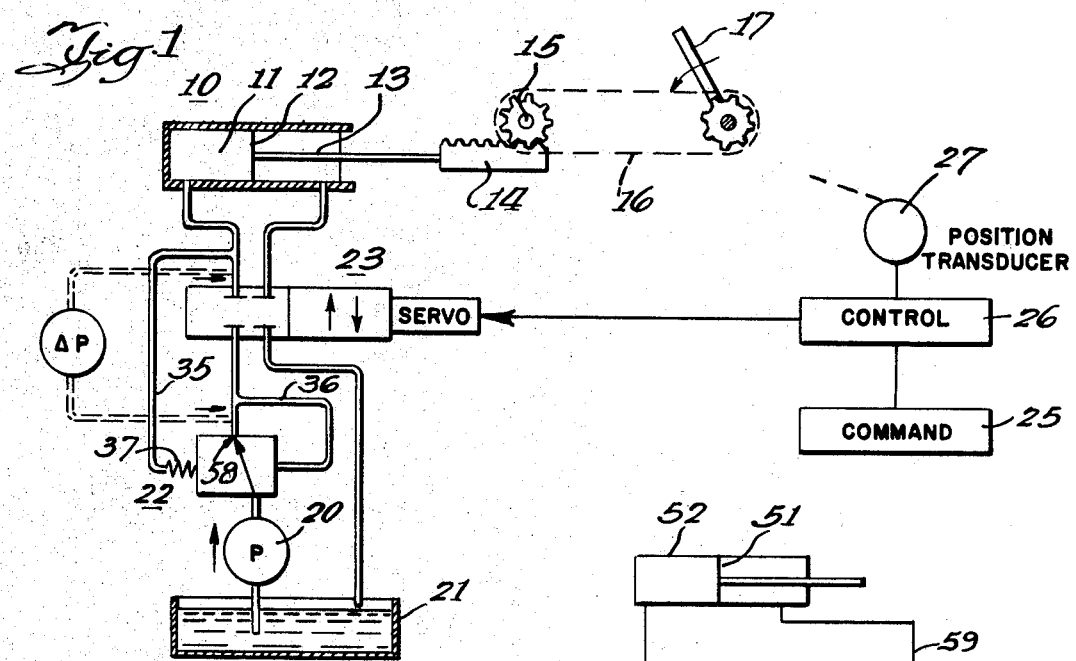
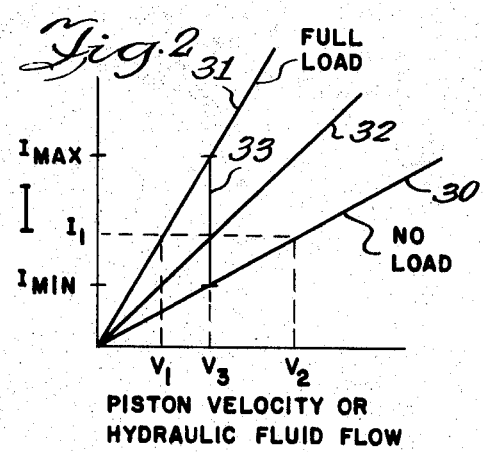
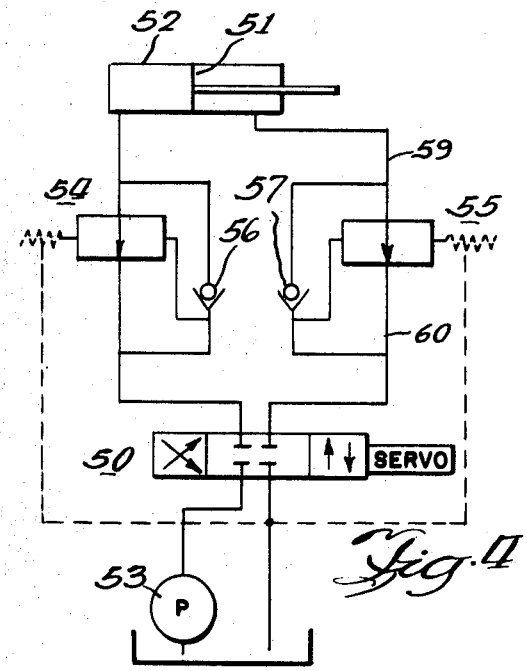
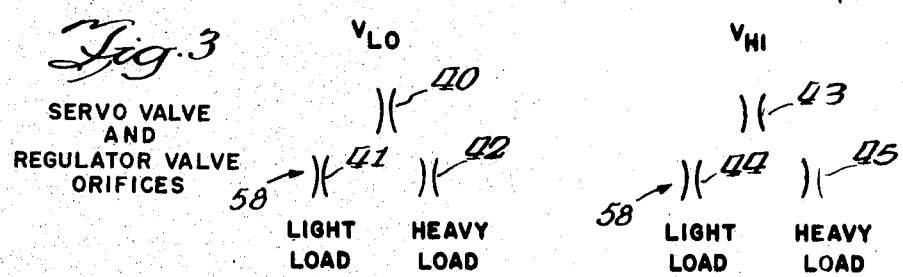

HYDRAULIC ACTUATOR CONTROL CIRCUIT

This invention relates to a hydraulic servo drive system and more particularly to such a system with an open feedback loop speed control.

It is a common practice to provide a hydraulic servo mechanism having a hydraulic drive means, as a piston and cylinder motor, an electrically operated servovalve controlling the supply of hydraulic fluid to the drive means and position and velocity feedback networks which control the operation of the valve.

In some cases, velocity feedback causes undesirable operating characteristics in the system. For example, consider a system having lost motion between the motor and the element being driven. If the velocity feedback transducer senses movement of the element being driven (rather than movement of the drive means), which is the usual situation, the response is generally as follows. At the start of the movement, the servovalve is commanded to open. Hydraulic fluid to the motor causes it to move but there is no immediate reaction at the driven element. Accordingly, the control calls for additional fluid to the motor, opening the servovalve farther. When the slack is taken up in the mechanical system, the moving element is rapidly accelerated causing a velocity feedback signal which indicates excessive speed. As a result, the servovalve is throttled back below the desired level. The result is an unstable, oscillatory condition which could damage the machine.

It is a principal object of this invention to provide a velocity control for a servo system without using a closed velocity feedback loop.

One feature of the invention is that the system includes a regulator valve in series with the servovalve, between the servovalve and the source of hydraulic fluid, to maintain the pressure drop across the servovalve at a constant value. Where the servovalve is operated in response to a velocity control signal, the regulator insures a constant velocity condition under varying load conditions.

Another feature is that the regulator valve has a flow control orifice in series with the servovalve orifice and as the pressure drop across the servo decreases, the regulator valve orifice opens to increase fluid flow. Conversely, an increase in the pressure drop across the servo causes a reduction in flow through the regulator.

Further features and advantages of the invention will readily be apparent from the following specification and from the drawings, in which:

FIG. 1 is a schematic diagram of a system embodying the invention;

FIG. 2 is a curve illustrating the operation of the invention;

FIG. 3 is a diagrammatic illustration of servo and regulator valve orifice configurations for different conditions of motor velocity and load; and FIG. 4 is a schematic diagram of a modified system embodying the invention.

In the embodiment of the system illustrated herein, a hydraulic piston and cylinder motor drive the bend arm of a tube bending machine. In this particular environment, a wide range of speed and load conditions are encountered; and the servo drive illustrated herein is particularly adapted to provide a uniform operation. Many other uses of the drive system will be apparent.

Turning now to FIG. 1, a hydraulic motor 10 including a cylinder 11 with a piston 12 movable therein operates through piston rod 13 to drive a rack 14. A pinion 15 rotated by the rack is connected through a chain 16 with the bend arm 17 of a rotary bending machine as, for example, the machine shown in the U.S. Pat. No. 3,156,287, to Munro.

Hydraulic motor 10 is operated by hydraulic fluid under pressure from pump 20 having an input connected with a source of hydraulic fluid or sump 21, and an outlet connected through regulator valve 22 and servovalve 23 with the cylinder 11. Mechanical details of the servovalve and regulator valve do not form a part of the invention and are not illustrated in the drawings. The description of the operating characteristics of the valves indicates their nature.

Velocity and position command information for the drive system is obtained from a source 25 and operates a control 26 which in turn generates an electric velocity control signal for servovalve 23. The amplitude of the control signal indicates to the servovalve the velocity of movement specified by command source 25. A position transducer 27 coupled with bend arm 17 relays position information to control 26 to stop the drive when the bend arm reaches the desired position. The amplitude of the signal from control 26 to servovalve 23 establishes a velocity of operation of the motor. Where velocity is an important characteristic of the system, it is desirable that a control signal of a given amplitude cause the same velocity of operation regardless of the load on the system. The command 25, control 26, and transducer 27 are conventional by themselves and may take the form of control shown in the Forrester et al. U.S. Pat. No. 3,069,608.

Assuming operation without regulator valve 22, it will be seen by reference to FIG. 2 that this is not the case. In FIG. 2 piston velocity (or hydraulic fluid flow) is plotted as the abscissa and servo control current I as the ordinate. The no-load and full load curves 30, 31 indicate the variation in piston velocity which may occur for a given control current $I_1$. For the current $I_1$, a piston velocity $V_1$ is achieved with a full load on the mechanism and a much higher velocity $V_2$ with no-load on the system. Desirably, however, operation of the system should follow a single line 32 between the no-load and full load curves and control current $I_1$ should cause a velocity $V_3$.

This result could be achieved using a velocity feedback which would cause operation at different current levels $I_{min}$ to $I_{max}$ on the vertical operating line 33. As discussed above, however, this can lead to a dangerous oscillatory condition.

In accordance with the invention, regulator valve 22 is interposed in the high pressure hydraulic line between pump 20 and servovalve 23. The regulator valve has a variable orifice indicated generally at 58 in FIG. 1 in series with the variable orifice of the servovalve through which hydraulic fluid is coupled to the driving end of cylinder 11. The regulator valve is responsive to a combination of the pressure at the outlet of servovalve 23, through connection 35, and the pressure at the inlet of servovalve 23, through connection 36, to maintain a constant pressure drop $\Delta P$ across the servovalve. A spring 37 in connection 35 establishes the pressure differential which is desired across the servovalve.

The regulator, by sensing variations in $\Delta P$, and reacting to keep $\Delta P$ constant, counteracts variations in the load on the hydraulic motor and maintains both a constant hydraulic fluid flow through the system and a constant motor velocity for a given signal from control 26.

In FIG. 3 the relationships of the servovalve and regulator valve orifice openings for different conditions of velocity and load are diagrammatically illustrated. At low velocity ($V_{Lo}$) the servovalve orifice is restricted as shown at 40. With a light load under this condition, the regulator valve is also restricted as indicated at 41. With a heavy load, piston 12 tends to move more slowly and the pressure differential across servovalve 23 is reduced. To compensate for this, the regulator valve opens to increase the hydraulic fluid flow, as indicated at 42. For high velocity ($V_{Hi}$) operation, the servovalve is wide open, 43. With a light load, the regulator valve has a medium opening 44 while with a heavy load the regulator valve is also full open, 45.

FIG. 4 shows a modified form of the invention in which a reversible servovalve 50 controls movement of piston 51 in either direction in cylinder 52. Pump 53 provides hydraulic fluid under pressure to the servovalve. A pair of regulator valves 54, 55, shunted by check valves 56, 57 are connected with the servovalve and the cylinder to regulate the flow of exhaust fluid, from the cylinder.

To move piston 51 to the right, hydraulic fluid from the servovalve flows through check valve 56 to the left side of piston 51. Hydraulic fluid discharged from the right side of the cylinder cannot flow through check valve 57 and is forced to flow through regulator valve 55, through passages 59 and 60, The flow is reversed to move the piston in the opposite direction.

I claim:

1. A hydraulic drive system comprising: a hydraulic motor; a source of hydraulic fluid under pressure; a variably positionable servovalve connected between said source and said motor; and a regulator valve in series with the said servovalve, means to maintain a constant pressure drop across the servovalve, said servovalve being responsive to control information to establish a flow orifice which is a function of a desired motor speed, said servovalve being electrically operated and including a source of control current input thereto, said current being a function of a desired motor speed.

2. A hydraulic drive system comprising: a hydraulic motor; a source of hydraulic fluid under pressure; a variably positionable servovalve connected between said source and said motor; and a regulator valve in series with the said servovalve, means to maintain a constant pressure drop across the servovalve, a source of speed and position command information, and a motor position feedback transducer and a control responsive to the command information and the feedback transducer, said control generating a constant control signal establishing a fixed flow control orifice in the servovalve, said regulator valve responding to changes in pressure drop across the servovalve to maintain the desired hydraulic fluid flow to the motor.